US008286409B2

(12) United States Patent
Junghans

(10) Patent No.: US 8,286,409 B2
(45) Date of Patent: Oct. 16, 2012

(54) METHOD AND APPARATUS, IN A BOTTLING PLANT, FOR PACKING BEVERAGE BOTTLES IN CASES WITH AND WITHOUT DIVIDERS AND A METHOD AND APPARATUS FOR PACKING CONTAINERS IN CASES WITH AND WITHOUT DIVIDERS

(75) Inventor: Joachim Junghans, Frankfurt (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 12/710,956

(22) Filed: Feb. 23, 2010

(65) Prior Publication Data

US 2010/0212265 A1 Aug. 26, 2010

Related U.S. Application Data

(63) Continuation-in-part of application No. PCT/EP2008/006114, filed on Jul. 25, 2008.

(30) Foreign Application Priority Data

Aug. 23, 2007 (DE) .......................... 10 2007 039 850

(51) Int. Cl.
*B65B 35/30* (2006.01)

(52) U.S. Cl. .............................. 53/448; 53/247; 53/543

(58) Field of Classification Search ................... 53/448, 53/443, 531, 543, 244, 247, 248
See application file for complete search history.

(56) References Cited

U.S. PATENT DOCUMENTS

| 2,308,209 | A | * | 1/1943 | Schmutzer et al. ........ 294/119.3 |
| 3,300,945 | A | | 1/1967 | Grossi et al. |
| 3,648,427 | A | * | 3/1972 | Raudat et al. ................... 53/497 |
| 3,780,492 | A | * | 12/1973 | Corderoy ......................... 53/247 |

(Continued)

FOREIGN PATENT DOCUMENTS

DE 19 28 397 A1 12/1970

(Continued)

OTHER PUBLICATIONS

International Search Report PCT/EP2008/006114 and English translation thereof.

(Continued)

*Primary Examiner* — Sameh H. Tawfik
*Assistant Examiner* — Eyamindae Jallow
(74) *Attorney, Agent, or Firm* — Nils H. Ljungman & Associates

(57) ABSTRACT

A method and apparatus, in a bottling plant, for packing beverage bottles in cases with and without dividers and a method and apparatus for packing containers in cases with and without dividers. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

20 Claims, 8 Drawing Sheets

U.S. PATENT DOCUMENTS

| | | | | |
|---|---|---|---|---|
| 3,842,570 | A * | 10/1974 | Monaghan | 53/397 |
| 3,843,316 | A * | 10/1974 | Amberg et al. | 432/124 |
| 4,199,050 | A * | 4/1980 | Moller | 198/429 |
| 4,905,456 | A * | 3/1990 | Olaechea | 53/446 |
| 5,242,256 | A * | 9/1993 | Appel | 414/416.01 |
| 5,575,376 | A * | 11/1996 | Colamussi | 198/468.3 |
| 5,851,042 | A * | 12/1998 | Bankuty et al. | 294/106 |
| 5,993,144 | A | 11/1999 | Inoue | |
| 6,763,929 | B2 * | 7/2004 | Malini | 198/419.3 |
| 8,011,198 | B2 * | 9/2011 | Ishikawa et al. | 62/228.4 |
| 2009/0049801 | A1 | 2/2009 | Hagenbrock et al. | |
| 2009/0235620 | A1 * | 9/2009 | Oppici | 53/543 |

FOREIGN PATENT DOCUMENTS

| | | |
|---|---|---|
| DE | 27 57 516 C2 | 6/1979 |
| DE | 2757516 A1 * | 6/1979 |
| DE | 29 00 584 A1 | 7/1980 |
| DE | 102 10 353 A1 | 9/2003 |
| DE | 10 2004 047 826 A1 | 3/2006 |
| DE | 10 2005 039842 A1 | 3/2007 |
| EP | 0 647 579 A | 4/1995 |
| EP | 647579 A1 * | 4/1995 |
| GB | 999 282 A | 7/1965 |
| GB | 999282 * | 7/1965 |
| JP | 3229338 B * | 11/2001 |
| NL | 8 304 111 A | 6/1985 |

OTHER PUBLICATIONS

German Search Report 10 2007 039 850.8-27.

* cited by examiner

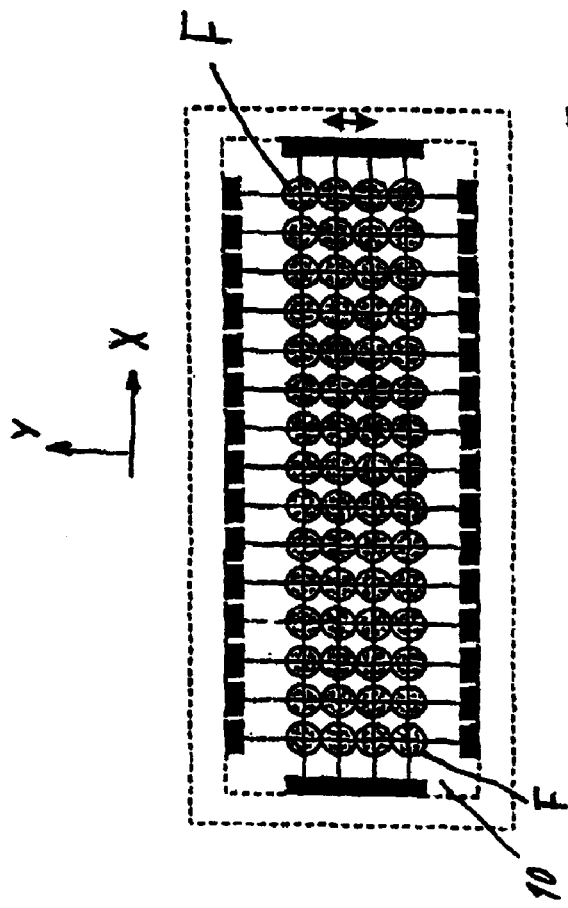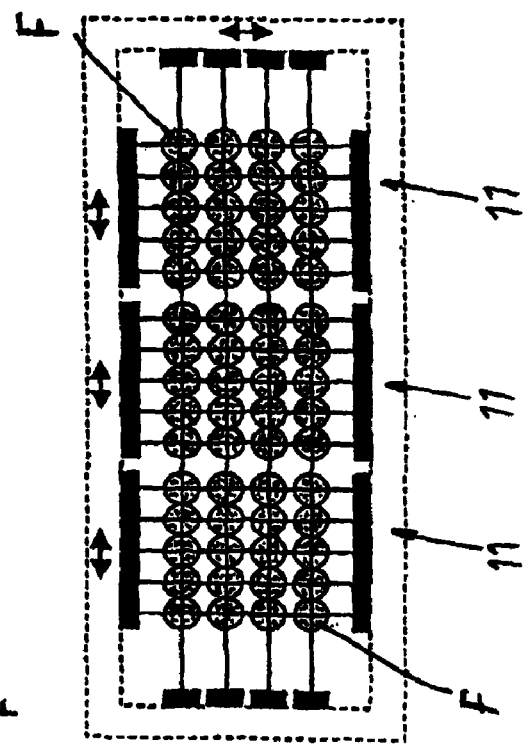
FIG. 3A
FIG. 3B

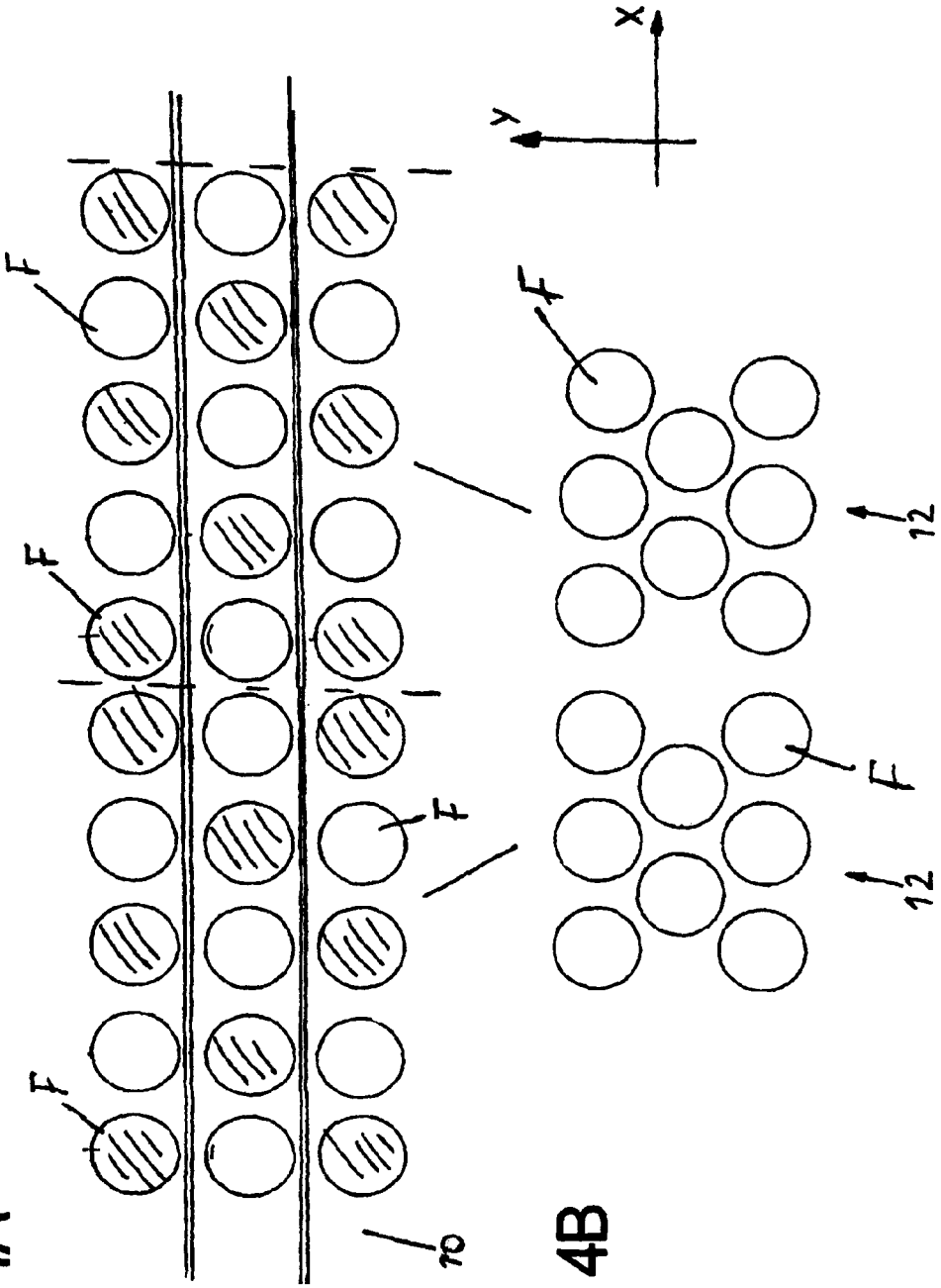

METHOD AND APPARATUS, IN A BOTTLING PLANT, FOR PACKING BEVERAGE BOTTLES IN CASES WITH AND WITHOUT DIVIDERS AND A METHOD AND APPARATUS FOR PACKING CONTAINERS IN CASES WITH AND WITHOUT DIVIDERS

CONTINUING APPLICATION DATA

This application is a Continuation-In-Part application of International Patent Application No. PCT/EP2008/006114, filed on Jul. 25, 2008, which claims priority from Federal Republic of Germany Patent Application No. 10 2007 039 850.8, filed on Aug. 23, 2007. International Patent Application No. PCT/EP2008/006114 was pending as of the filing date of this application. The United States was an elected state in International Patent Application No. PCT/EP2008/006114.

BACKGROUND

1. Technical Field

The present application relates to a method and apparatus, in a bottling plant, for packing beverage bottles in cases with and without dividers and a method and apparatus for packing containers in cases with and without dividers.

2. Background Information

Background information is for informational purposes only and does not necessarily admit that subsequently mentioned information and publications are prior art.

The present application relates to a packing head for use in a device for picking up container groups standing ready in a first configuration in a pick-up area, and for depositing said container groups in a delivery area. The packing head comprises a plurality of container grippers or packing bells, each for gripping one container. The packing bells are movable on a packing head frame in a displacement plane (X-Y plane) perpendicular or essentially perpendicular to the axis of the respective container for changing the configuration or arrangement of the containers in the container group on the packing head.

Packing heads are used, for example, to unpack or pick up bottles or similar containers as container groups comprising multiple containers from boxes, for example bottle cases, and deposit these on a conveyor belt, or conversely to pick up containers, which have been guided into tracks or are standing ready in multiple rows or tracks in a pick-up area, as container groups and then deposit these in a delivery area, for example placing them in boxes standing ready there for this purpose. In such cases, it is usually necessary or may be desired to rearrange the respective container group picked up by the packing head, or the containers that are held suspended by grippers or packing bells of the packing head after being picked up and before being deposited in the deposit or placement area, in order to modify the configuration, i.e., the arrangement of the containers relative to one another in the picked-up position in the container group, for example, such that the arrangement then corresponds to the configuration that is required at the delivery area, for example the compartment partitioning of a bottle case.

To enable this change in configuration, each of the grippers or packing bells may be disposed on mounts or sliding frames of the packing head. The mounts or sliding frames can be displaced during operation in two displacement axes that extend perpendicular or substantially perpendicular to one another and horizontally or substantially horizontally. The mounts or sliding frames are connected to one another via plate link conveyor chains, so that by extending and compressing the plate link conveyor chains, for example with a pneumatic cylinder, two different configurations are possible, for example with different distances between adjacent packing bells in the two displacement axes. Because the configurations of the container groups that are possible with the packing head are determined by the plate link conveyor chains that are used, in order to change the configuration the plate link conveyor chains must be exchanged, which is associated with substantial expenditure on labor.

OBJECT OR OBJECTS

An object of the present application is to avoid, restrict, and/or minimize this disadvantage and to propose a packing head which will enable container groups to be picked up and/or deposited in the widest range of configurations, even without a mechanical exchange of plate link conveyor chains or similar mechanical positioning devices.

SUMMARY

To attain this object, the present application discloses a packing head for use in a device for picking up container groups standing ready in a first configuration in a pick-up area, and for depositing said container groups in a delivery area. The packing head comprises a plurality of container grippers or packing bells, each for gripping one container. The packing bells are movable on a packing head frame in a displacement plane (X-Y plane) perpendicular or essentially perpendicular to the axis of the respective container for changing the configuration or arrangement of the containers in the container group on the packing head. The packing bells are provided on the packing head frame so as to be movable in a controlled manner, individually or as a group, by at least one actuator.

In the packing head of the present application, each of the grippers or packing bells is provided on mounts or sliding carriages, which can be moved in a controlled manner within a displacement plane, perpendicular or essentially perpendicular to the axis of the containers that are held hanging from the packing bells, i.e., for example, in at least two displacement axes that define these displacement planes. With the present application, the widest range of configurations of the containers in the container groups are possible, both when picking up said containers and when depositing said containers, without an exchange of plate link conveyor chains or similar mechanical positioning devices being required. The present application thus makes it possible, in one possible embodiment, to process different container cases, i.e., container cases that differ significantly and/or differ substantially in terms of length and/or width and/or number and/or arrangement of the containers or compartments, for example, in one and the same system without mechanical modifications.

The mounts or sliding carriages that support the packing bells are in one possible embodiment program-controlled by means of a computer. In addition to the controlled positioning, the individual packing bells in the packing head of the present application are in one possible embodiment also individually actuable. The widest variety of actuators are suitable for use as drives for the movable mounts and/or sliding carriages, or as the mounts themselves, for example linear motors, stepping, or servo motors, etc. The term servo motor within the scope of this application also includes drives in which several motors controlled by a computer execute synchronized or substantially synchronized movements.

In one possible embodiment of the present application, the packing head may be used to handle beverage bottles, containers, glass jars, glass bottles, canning jars, PET bottles, or other similar containers.

Further improvements, advantages and potential applications for the present application are disclosed in the following description of exemplary embodiments and in the set of drawings. All described and/or illustrated characterizing features, alone or in any combination, constitute the subject of the present application.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

In what follows, the present application will be disclosed in greater detail within the context of possible embodiments, in reference to the set of drawings:

FIGS. 3A and 3B show different container configurations intended to illustrate the mode of operation of the packing head of FIGS. 1 and 2;

FIGS. 4A and 4B show different container configurations intended to illustrate the mode of operation of the packing head of FIGS. 1 and 2;

DESCRIPTION OF EMBODIMENT OR EMBODIMENTS

Figure 1:
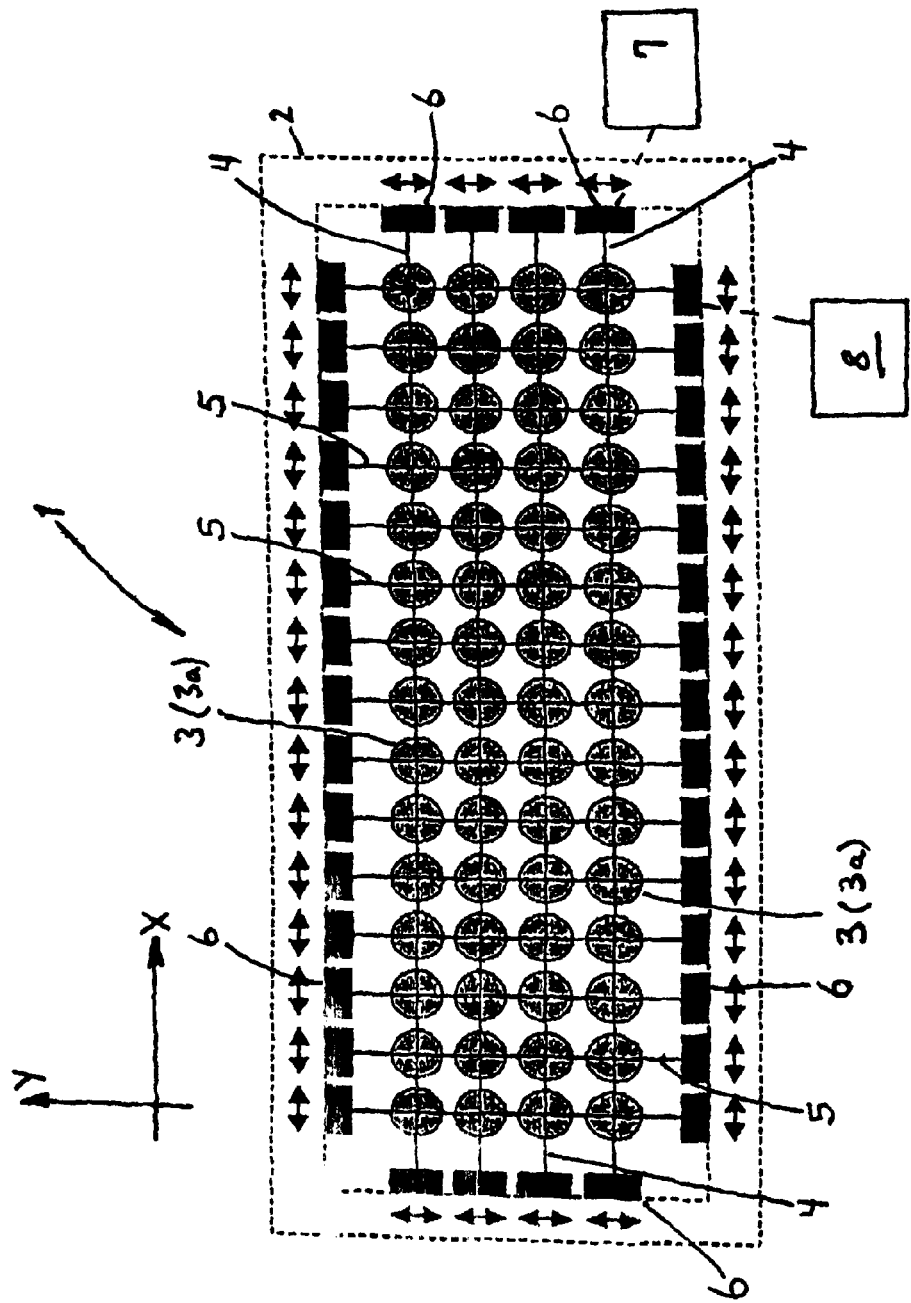
FIG. 1 shows a simplified, schematic representation of a plan view of a sliding carriage or cross carriage assembly of a packing head according to the present application.
Figure 2:
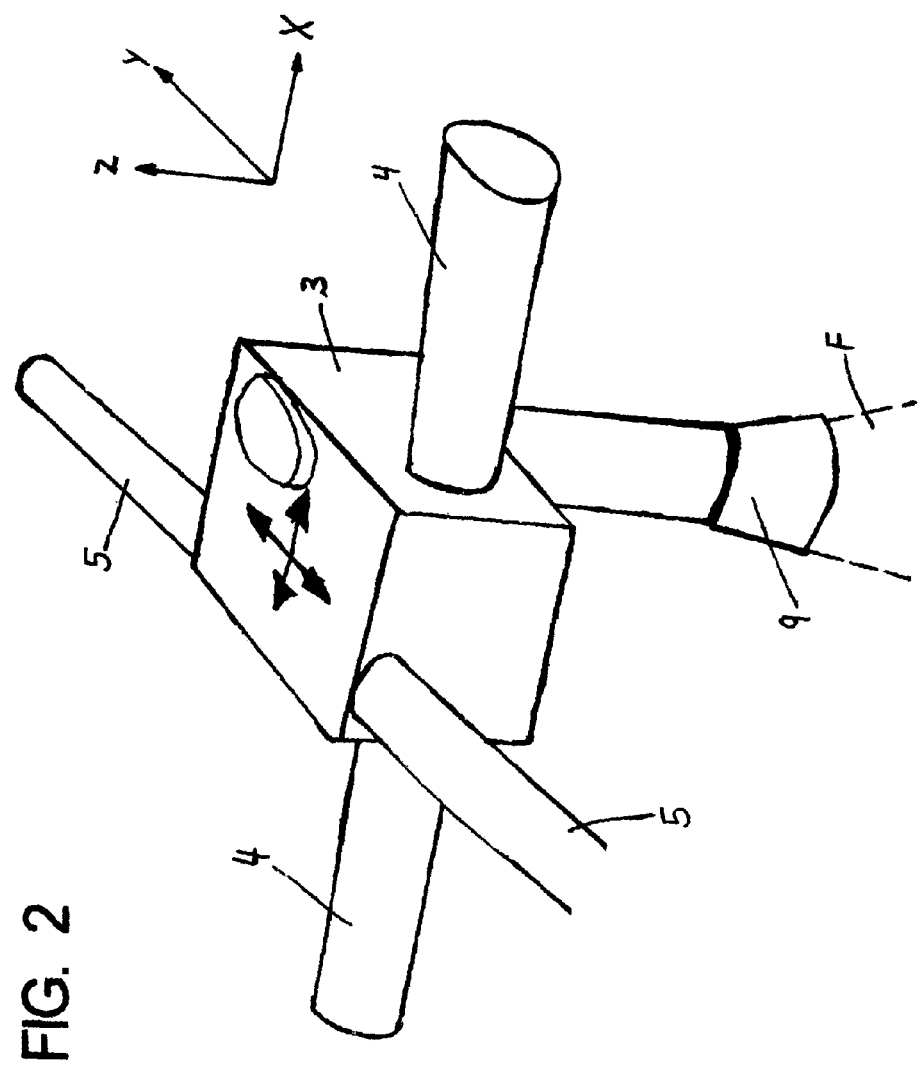
FIG. 2 shows a perspective, detailed representation of a cross carriage of the cross carriage assembly of FIG. 1, together with a packing bell provided on the cross carriage.

For purposes of clarification, the three spatial axes that extend perpendicular or substantially perpendicular to one another, the horizontal X-axis, the horizontal Y-axis and the vertical Z-axis, are marked in each of the figures as X, Y, and Z.

In the figures, 1 is a packing head of a system, not illustrated in greater detail, for moving groups of containers or bottles from a pick-up position or a pick-up area to a delivery position or a delivery area, for example for packing bottles F as bottle groups into cases, with the bottles having been fed to the pick-up position via a transport system in a multi-track flow of bottles or in tracks, or, conversely, for removing bottles F as bottle groups from cases and depositing the bottle groups on a transport system.

The packing head 1 essentially comprises a frame 2 with a plurality of mounts or cross carriages 3 and a plurality of bar-type guiding and actuating elements 4 and 5, wherein the guiding and actuating elements 4 are arranged parallel or substantially parallel to one another and spaced from one another and are oriented with their respective axes in a horizontal direction, i.e., in the X-axis, and the guiding and actuating elements 5 are also arranged parallel or substantially parallel to one another and spaced from one another are oriented with their respective axes in the horizontal direction and are perpendicular or substantially perpendicular to the guiding and actuating elements 4, i.e., in the Y-axis.

Moreover, in the embodiment shown here, the guiding and actuating elements 4 are arranged with their axes in at least one horizontal plane (X-Y plane) and the guiding and actuating elements 5 are arranged with their axes also in at least one horizontal plane (X-Y plane), but above the guiding and actuating elements 4.

The guiding and actuating elements 4 and 5 are also held with each of their ends on sliding blocks 6, which are in turn displaceably guided on the frame 2 perpendicular or substantially perpendicular to the longitudinal extension of the associated guiding and actuating elements 4 or 5, as indicated by double arrows in FIG. 1.

At each point of intersection between two guiding and mounting elements 4 and 5, a cross carriage 3 is provided, which is displaceably guided on these guiding and actuating elements 4 and 5.

With the arrangement of the cross carriages 3 at the points of intersection of the guiding and actuating elements 4 or 5, the cross carriages 3 are arranged in multiple rows extending in the direction of the X-axis, i.e., in the illustration of FIG. 1, in a total of four such rows, and in multiple columns, each extending in the Y-axis, i.e., in the representation of FIG. 1 in a total of fifteen columns.

At least one actuator is assigned to the guiding and actuating elements 4 on the frame 2, with said actuator being indicated in FIG. 1 by the unit 7. The guiding and actuating elements 4 can be displaced or repositioned in a controlled manner crosswise to their longitudinal extension, i.e., in the Y-axis, by correspondingly operating or actuating the actuator 7, in at least one possible embodiment such that the distance between adjacent guiding and actuating elements 4 and thus also the distance between the cross carriages 3 that are adjacent to one another in the direction of the Y-axis can be modified in the same direction and by the same or a different distance, while essentially maintaining the symmetry of the cross carriage arrangement in relation to a center frame plane which lies in the X-Z plane, for example.

At least one actuator, indicated in FIG. 1 by the unit 8, is also assigned to the guiding and actuating elements 5. By correspondingly operating or actuating the actuator 8, the guiding and actuating elements 5 can be displaced or repositioned in a controlled manner crosswise to their longitudinal extension, i.e., in the X-axis, again, in at least one possible embodiment, such that the distance between adjacent guiding and actuating elements 5, and thus also the distance between the cross carriages 3 that are adjacent to one another in the direction of the X-axis, can be modified in the same direction and by the same or a different distance, while essentially maintaining the symmetry of the cross carriage arrangement in relation to a center frame plane which lies in the Y-Z plane, for example.

On each cross carriage 3, a container gripper in the form of a packer bell 9 is provided, which projects beyond the underside of the cross carriage 3 in the direction of the Z-axis, and which can grasp a bottle F by its mouth.

With the packing head 1, which in practical operation is provided on a lifting and transfer device for a controlled lifting movement in a vertical direction, i.e., in the Z-axis, and for a controlled transfer movement in a horizontal axis, e.g., in the Y-axis, the widest range of operating or processing modes is possible.

FIGS. 3A and 3B show the use of the packing head 1 to place groups of bottles in bottle cases. According to the position of FIG. 3A, the bottles F are fed by a conveyor system to a pick-up area or packing table 10, on which the bottles F stand ready in multiple rows or tracks, each extending in the direction of the X-axis, in the possible embodiment shown here, in four rows or tracks, each comprising fifteen bottles F, such that the bottles F form fifteen columns in the Y-axis, each with four bottles F directly adjacent to one another.

This bottle arrangement in FIG. 3A, standing ready on the packing table 10, is grasped by the packing head 1 or by its packing bells 9, and after being lifted off the packing table 10 are rearranged crosswise to their longitudinal extension via a controlled displacement of the guiding and actuating elements 4 and 5, so that the bottles F then form three bottle groups 11 corresponding to the position seen in FIG. 3B for placement in three bottle cases, with the bottles F in said groups positioned close against one another in four rows oriented in the direction of the X-axis, and with these rows of bottles being spaced from one another in the direction of the Y-axis.

FIGS. 4A and 4B show another operating mode, in which three rows of the bottles F fed to the packing table 10 via a conveyor system are formed on said table in separate tracks, in at least one possible embodiment as seen in FIG. 4A, such that the bottles F in each row are positioned close to one another, and each bottle in a row is adjacent to another row of bottles F, spaced in the direction of the Y-axis, thus the bottles F in this formation are in turn arranged in rows and columns that extend perpendicular or substantially perpendicular to one another.

From the arrangement formed on the packing table 10, those bottles F marked by crosshatching in FIG. 4A are grasped and picked up by the individually actuable packing bells 9 of the packing head 1. Once the bottle configuration has been picked up, by correspondingly actuating the guiding and actuating elements 4 and 5 and thereby the cross carriages 3, two bottle groups 12 are formed as seen in FIG. 4B, each comprising three rows extending in the direction of the X-axis, with each of the two outer rows comprising three bottles F and the center row comprising two bottles F, which are offset in relation to the bottles F of the outer rows into the gaps. This is achieved via a corresponding displacement of the guiding and actuating elements 5 so as to reduce the distance between the cross carriages 3 for each bottle group 12 in the X-axis and a corresponding displacement of the guiding and actuating elements 4 so as to reduce the distance between the cross carriages 3 in the Y-axis.

The above description assumed that the packing head 1 serves to pick up the bottles F as bottle groups from the packing table 10 (pick-up area) and to deposit the bottles F as bottle groups 11 and/or 12 in bottle cases (placement area). Of course, the packing head 1 can be used similarly in reverse, to remove bottles F from cases in a configuration that is predetermined by the configuration of the case, for example, and to then deposit the bottles in a rearranged configuration on a conveyor system or flat or packing table 10.

With the arrangement of the cross carriages 3 on the guiding and actuating elements 4 and 5 in the embodiment of FIG. 1, it is possible to displace the cross carriages provided on the respective guiding element 4 or 5, and thus also the associated packing bells 9, together in the X-axis (by displacing the relevant guiding or actuating element 5) or in the Y-axis (by displacing the relevant guiding or actuating element 4).

Figure 5:
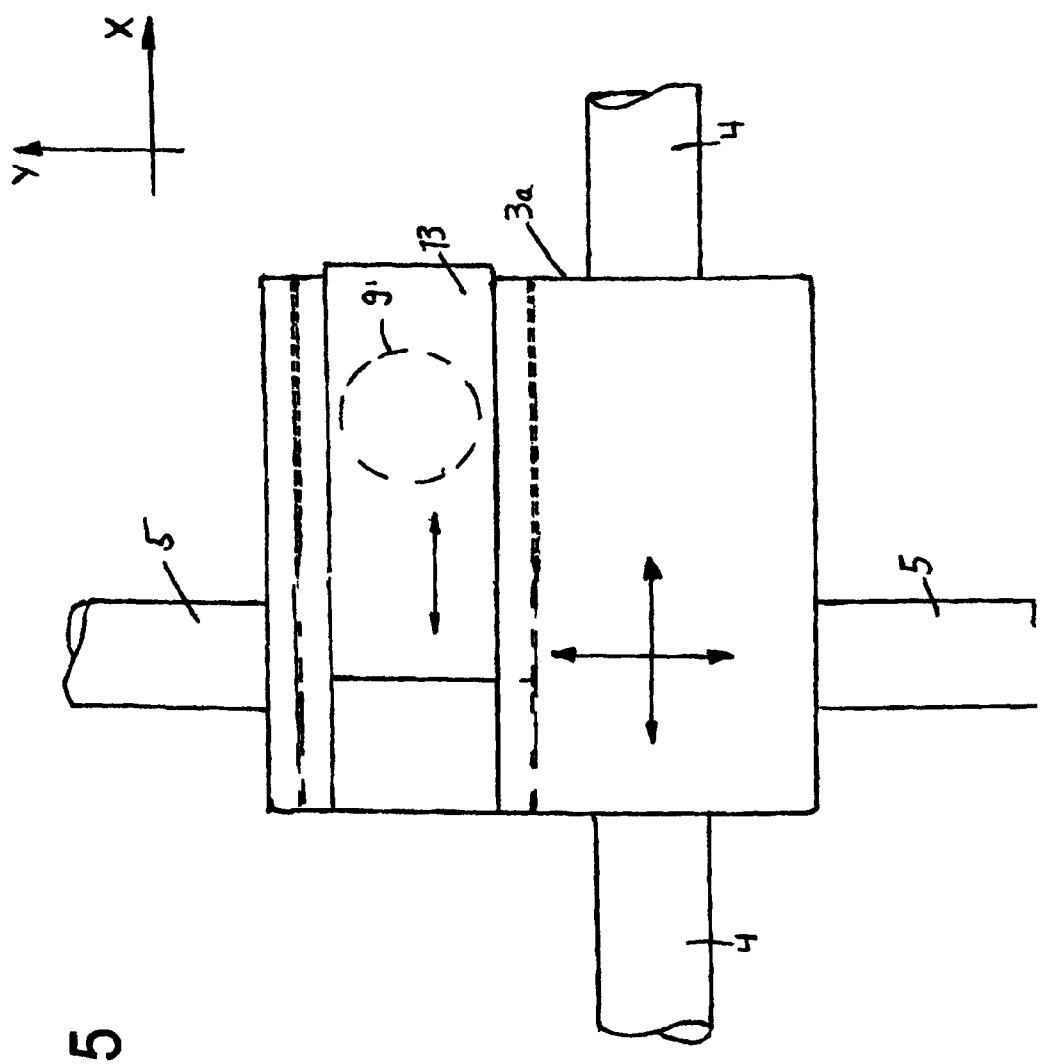
FIG. 5 shows a simplified representation of a plan view of a cross carriage of a further embodiment of the packing head of the present application.

FIG. 5 shows a highly schematic representation of a plan view of a cross carriage 3a of a packing head, which (cross carriage 3a) has a greater degree of freedom with respect to the rearrangement of the bottle groups held on the packing head, in at least one possible embodiment, in that the packing head is provided to be displaceable or movable in a controlled manner in the X-Y plane relative to the cross carriage 3a that holds it, in at least one possible embodiment, for example, on an auxiliary carriage 13, which can be displaced linearly in this plane, for example in the X-axis, via its own actuator. In principle, the packing bell 9 can also be displaced relative to the cross carriage 3a via a rotational or pivoting movement. In this case the packing head is embodied such that some of the cross carriages are embodied as cross carriages 3a with the added displacement capability or displacement axis for the packing bell 9, for example a number of cross carriages for every second row of sliding carriages that extend in the X-axis. For example, with a packing head having three rows of cross carriages extending in the direction of the X-axis, the center row has cross carriages 3a, whereas the outer rows are made up of cross carriages In the center row, for example, every second cross carriage is also a cross carriage 3a with the additional displacement axis for the packing bell 9, whereas otherwise cross carriages 3 are also used in the center row of the packing head or the cross carriage assembly.

Figure 6A:
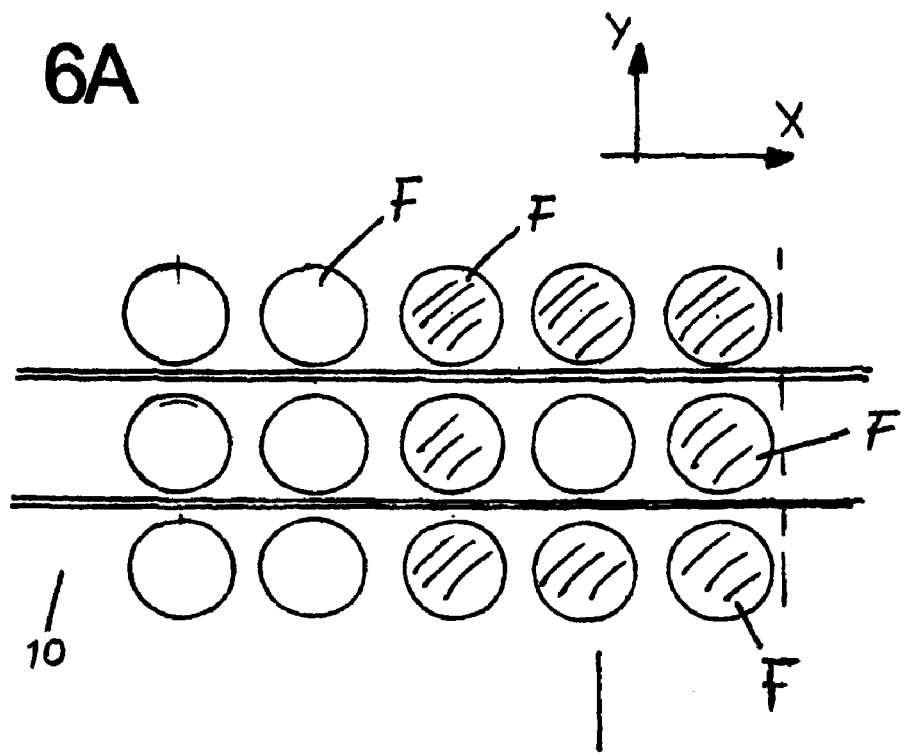
FIGS. 6A and 6B show different container configurations intended to illustrate the mode of operation of the packing head with cross carriages of FIG. 5.
Figure 6B:
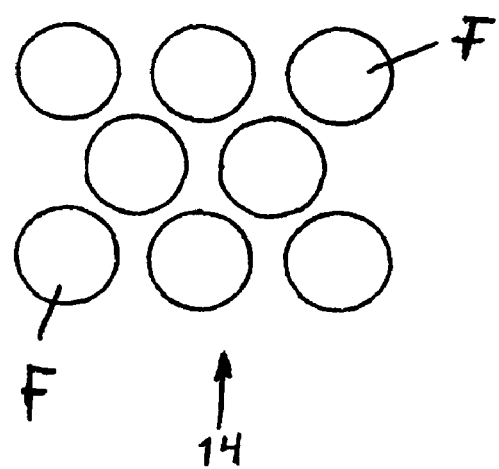

FIGS. 6A and 6B show a possible mode of operation of the packing head, which is partly equipped with the cross carriages 3a. On the packing table 10, the bottles F are again placed in a configuration comprising three rows of bottles arranged in separate tracks and extending in the X-axis, with each bottle in each row of bottles in the Y-axis is adjacent to a bottle in another row, in other words the bottles F are arranged on the packing table 10 in a configuration comprising a plurality of rows extending in the X-axis and a plurality of columns extending in the Y-axis. With the packing head, or with the individually actuable packing bells of said packing head, only those bottles F marked by crosshatching in FIG. 6A are grasped, specifically three bottles F from each outer row and two bottles F from the center row, with the bottles in this center row being spaced from one another by twice the bottle distance. After the bottles F are picked up from the packing table 10, the grasped bottle group, comprising a total of eight bottles F, is rearranged in such a way that when the bottle group 14 is deposited it has two outer rows, each comprising three bottles F and extending in the direction of the X-axis, and one center row, which also extends in the direction of the X-axis but contains only two bottles F which are offset in relation to the bottles of the outer row into the gaps. This new configuration, as seen in FIG. 6B, of the bottle group 14 is achieved in that the bottles F of the center row are held on cross carriages 3a, with which, in addition to the basic displacement of the cross carriages via the guiding and actuating elements 4 and 5, an individual adjustment of the packing bells 9 in the X-axis is possible.

In one possible embodiment of the present application, the packing head 1 may be used in a beverage bottling plant, to pick up groups of filled, closed, and/or labeled beverage bottles and transport these groups of filled, closed, and/or labeled beverage bottles into beverage bottle cases or beverage bottle boxes. The beverage bottles cases, which may be disposed in the placement area, may be cases or boxes with partitions and/or inserts in the boxes. The partitions and/or inserts may comprise cardboard, plastic, or other such materials. The partitions and/or inserts may produce sections in the case, so that one beverage bottle fits into each section produced by the partitions and/or inserts.

When the beverage bottles are moved from the packing table 10 to the placement area, the bells 9 may be displaced and/or moved to spread the bottles out in such a way that one bottle may be inserted into each section of the case, produced by the partitions and/or inserts.

Figure 7:
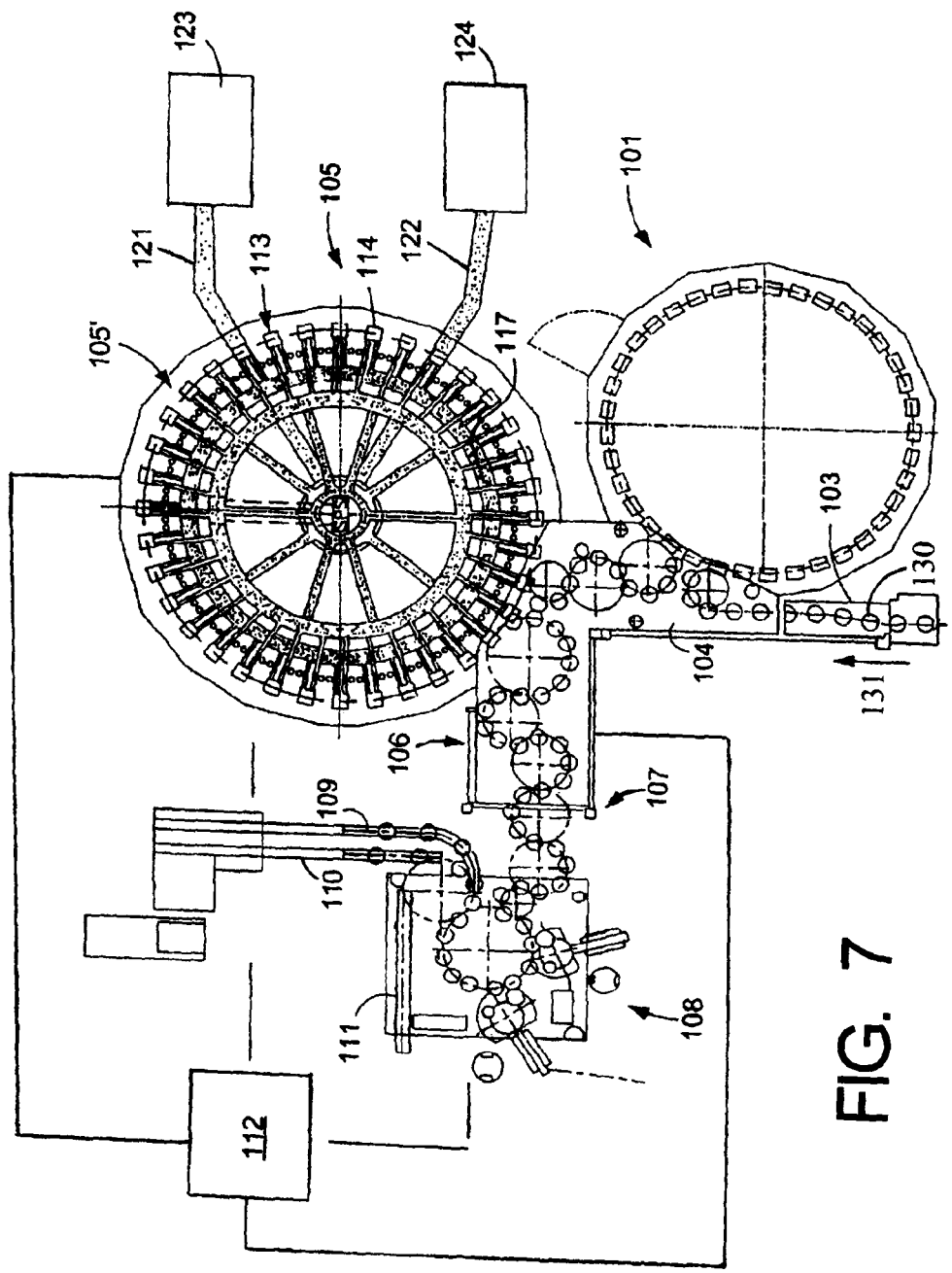
FIG. 7 shows schematically the main components of one possible embodiment example of a system for filling containers in accordance with at least one possible embodiment, in which system or plant could possibly be utilized at least one aspect, or several aspects, of the embodiments disclosed herein.

FIG. 7 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 7 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 7, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

Figure 8:
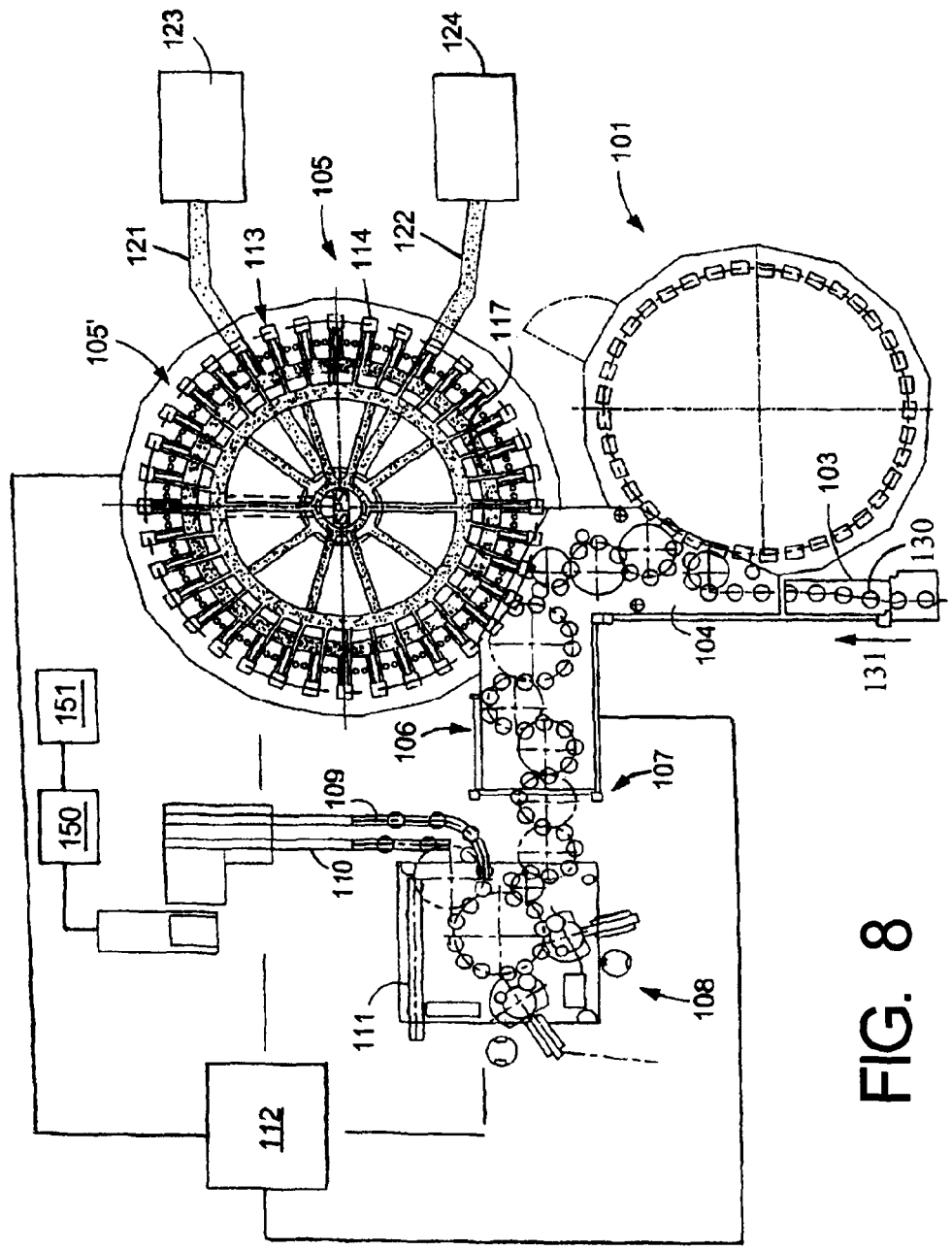
FIG. 8 shows a possible embodiment, similar to FIG. 7, additionally comprising the packing head of the present application.

FIG. 8 shows an embodiment similar to that which is illustrated in FIG. 7. FIG. 8 shows a container filling plant with machines 150 and 151. In one possible embodiment of the present application, the machine 150 may be a grouping arrangement 150 or a buffer area 150, with the packing head 151 of the present application being disposed downstream the machine 150.

The present application has been disclosed in reference to possible embodiments. Of course, numerous changes and modifications are possible, without this constituting a departure from the teaching idea upon which the present application is based.

Packing head for use in a device for picking up container groups standing ready in a first configuration in a pick-up area and for depositing the container groups in a placement or delivery area, comprising a plurality of packing bells, each for grasping one container, wherein the packing bells are movable in a controlled manner, perpendicular to the axis of the respective container on the packing head, in at least two axis directions (X-axis, Y-axis), which extend perpendicular to one another, to change the configuration or arrangement of the containers in the container group on a packing head frame.

One feature or aspect of an embodiment is believed at the time of the filing of this patent application to possibly reside broadly in a packing head for use in a device for picking up container groups standing ready in a first configuration in a pick-up area, and for depositing said container groups 11, 12, and 14 in a delivery area, comprising a plurality of container grippers or packing bells 9, each for gripping one container F, wherein the packing bells 9 are movable on a packing head frame 2 in a displacement plane (X-Y plane) perpendicular or essentially perpendicular to the axis of the respective container F for changing the configuration or arrangement of the containers F in the container group on the packing head 1, wherein the packing bells 9 are provided on the packing head frame 2 so as to be movable in a controlled manner, individually or as a group, by at least one actuator 7, 8.

Another feature or aspect of an embodiment is believed at the time of the filing of this patent application to possibly reside broadly in the packing head, wherein the packing bells 5 are movable in a controlled manner in the displacement plane (X-Y plane) in at least two displacement axes (X-axis, Y-axis) that extend perpendicular to one another or essentially perpendicular to one another.

Yet another feature or aspect of an embodiment is believed at the time of the filing of this patent application to possibly reside broadly in the packing head, wherein the packing bells 5 are provided on sliding carriages 3, 3a, and in that the sliding carriages 3, 3a are movable individually in a controlled manner in the displacement plane or in the displacement axes (X-axis, Y-axis).

Still another feature or aspect of an embodiment is believed at the time of the filing of this patent application to possibly reside broadly in the packing head, wherein the packing bells 5 are provided on sliding carriages 3, 3a, and in that the sliding carriages 3, 3a are movable in groups in a controlled manner in the displacement plane or in the displacement axes (X-axis, Y-axis).

A further feature or aspect of an embodiment is believed at the time of the filing of this patent application to possibly reside broadly in the packing head, wherein the sliding carriages 3, 3a are provided so as to be movable in groups on a guide element 4, 5 in a displacement axis (X-axis, Y-axis).

Another feature or aspect of an embodiment is believed at the time of the filing of this patent application to possibly reside broadly in the packing head, wherein the sliding carriages 3, 3a with the respective guide element 4, 5 are movable in a controlled manner in a displacement axis (Y-axis, X-axis) that extends perpendicular to the longitudinal extension of said guide element 4, 5.

Yet another feature or aspect of an embodiment is believed at the time of the filing of this patent application to possibly reside broadly in the packing head, wherein the sliding carriages as cross carriages 3, 3a are movable in a controlled manner on two intersecting guide elements 4, 5.

Still another feature or aspect of an embodiment is believed at the time of the filing of this patent application to possibly reside broadly in the packing head, wherein the guide elements 4, 5 are movable in a controlled manner for displacing the cross carriages 3, 3a perpendicular to their longitudinal extension via actuators 7, 8.

A further feature or aspect of an embodiment is believed at the time of the filing of this patent application to possibly reside broadly in the packing head, wherein the guide elements 4, 5 are each formed by at least one guide rail or guide bar.

Another feature or aspect of an embodiment is believed at the time of the filing of this patent application to possibly reside broadly in the packing head, wherein at least one sliding carriage 3a is embodied with at least one additional controlled axis of motion for a controlled linear movement and/or rotational movement of the associated packing bell 9.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . ." may possibly not be used or useable in any one or more embodiments of the application.

The sentence immediately above relates to patents, published patent applications and other documents either incorporated by reference or not incorporated by reference.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025,684 issued to Yasui on Feb. 15, 2000.

Some examples of synchronous motors which may possibly be utilized or adapted for use in at least one possible embodiment may possibly be found in the following U.S. Pat. No. 6,713,899, entitled "Linear synchronous motor;" U.S. Pat. No. 6,486,581, entitled "Interior permanent magnet synchronous motor;" U.S. Pat. No. 6,424,114, entitled "Synchronous motor;" U.S. Pat. No. 6,388,353, entitled "Elongated permanent magnet synchronous motor;" U.S. Pat. No. 6,329,728, entitled "Cylinder-type linear synchronous motor;" U.S. Pat. No. 6,025,659, entitled "Synchronous motor with movable part having permanent magnets;" U.S. Pat. No. 5,936,322, entitled "Permanent magnet type synchronous motor;" and U.S. Pat. No. 5,448,123, entitled "Electric synchronous motor."

Some examples of cases for beverage bottles, which may possibly be utilized or adapted for use in at least one possible embodiment of the present application, may possibly be found in the following U.S. Pat. No. 5,105,962, having the title "Two-part case of plastic or a similar material especially for accommodating beverage bottles," published on the Apr. 21, 1992; U.S. Pat. No. 5,273,175, having the title "Split box case construction," published Dec. 28, 1993; U.S. Pat. No. 7,097,033, having the title "Stackable low depth case with handle structure," published on Aug. 29, 2006; U.S. Pat. No. 7,128,234, having the title "Stackable low depth bottle case," published on Oct. 31, 2006; U.S. Pat. No. 5,031,761, having the title "Reusable case for beverage bottles," published on Jul. 16, 1991; and U.S. Pat. No. 4,819,822, having the title "Pilfer resistant beverage case," published on Apr. 11, 1989.

Some examples of grippers or transport systems configured to transfer bottles or container by the container neck, which may possible be utilized or adapted for use in at least one possible embodiment of the present application, may possibly be found in the following: U.S. patent application Ser. No. 12/353,999, having the title "ROTARY BEVERAGE BOTTLE FILLING MACHINE CONFIGURED TO FILL BEVERAGE BOTTLES WITH DIFFERENT DIAMETERS, SIZES, AND SHAPES WITHOUT CHANGING BOTTLE CARRIERS AND A CONTAINER TREATMENT MACHINE CONFIGURED TO HANDLE CONTAINERS WITH DIFFERENT DIAMETERS, SIZES, AND SHAPES WITHOUT CHANGING CONTAINER CARRIERS," filed on Jan. 15, 2009; U.S. Pat. No. 7,028,857, having the title "PLASTIC WATER BOTTLE AND APPARATUS AND METHOD TO CONVEY THE BOTTLE AND PREVENT BOTTLE ROTATION," published Apr. 18, 2006; U.S. Pat. No. 7,454,878, having the title "ANTI-ROTATION NECK SUPPORT KNIFE," published on Nov. 25, 2008; U.S. Pat. No. 5,299,889, having the title "PNEUMATIC CONVEYOR APPARATUS," published on Apr. 5, 1994; and U.S. Pat. No. 5,484,237, having the title "PNEUMATIC CONVEYOR APPARATUS HAVING AIR DEFLECTORS," published on Jan. 16, 1996.

One possible example of a meter belt, which may be utilized to provide a buffer area of containers to be handled by the packing head of the present application, may possibly be found in the U.S. patent application Ser. No. 12/372,252, having the title "CONVEYING APPARATUS FOR THE CONVEYING OF BEVERAGE BOTTLES FROM A BEVERAGE BOTTLE TREATMENT MACHINE TO A BEVERAGE BOTTLE PACKAGING MACHINE IN A BEVERAGE BOTTLING PLANT, AND A CONVEYING APPARATUS FOR THE CONVEYING OF PRODUCTS FROM A PRODUCT TREATMENT MACHINE TO A PRODUCT PACKAGING MACHINE," filed on Feb. 17, 2009.

Some examples of bottle packaging machines, with components which may be utilized or adapted for use in at least one possible embodiment of the present application, may possibly comprise the HP50, UP20, HP20, and SK16 robots, manufactured by Motoman Inc., headquartered at 805 Liberty Lane, West Carrollton, Ohio 45449, United States. Some other examples of bottle packaging machines, with components which may be utilized or adapted for use in at least one possible embodiment of the present application, may possibly comprise the PPZ 2100/2600/3100 packing robots, RS 3 packing robot, RK packing robot, and SP 1200/1400/1800 packing robots manufactured by KHS Maschinen and Anlagenbau AG.

All of the patents, patent applications or patent publications, except for the exceptions indicated herein, which were cited in the International Search Report dated Nov. 21, 2008, and/or cited elsewhere are hereby incorporated by reference as if set forth in their entirety herein, as follows: NL 8 304 111, having the following English translation of the Dutch title "Bottle handling gripper frame -711 has four spaced gripper heads in one direction, and three spaced gripper heads at right angles to first," published on Jun. 17, 1985; U.S. Pat. No. 5,993,144, having the title "Complex-type article conveying apparatus," published on Nov. 30, 1999; EP 0 647 579, having the title "Product handling device and relative apparatus," published on Apr. 12, 1995; DE 29 00 584, having the following German title "FLASCHENHALTERAHMEN ZUM GLEICHZEITIGEN BUENDELWEISEN UM-UND EINSETZEN VON IN ANFOERDERRICHTUNG PARALLELEN REIHEN AUFGESTAUTEN FLASCHEN U.DGL.

IN KISTEN, KAESTEN, HARASSE O.DGL.," published on Jul. 17, 1980; GB 999 282, having the title "Improvements relating to machines for loading bottles into cartons, boxes or the like," published on Jul. 21, 1965; DE 19 28 397, having the German title "Greiferkopf fuer eine Flaschenumladevorrichtung," published on Dec. 10, 1970; U.S. Pat. No. 3,300,945, having the title "Method and apparatus for packaging," published on Jan. 31, 1967; and DE 10 2005 039842, having the following English translation of the German title "METHOD FOR THE MANUFACTURE OF MIXED PACKAGES AND DEVICE FOR CARRYING OUT THE METHOD," published on Mar. 1, 2007.

All of the patents, patent applications or patent publications, except for the exceptions indicated herein, which were cited in the German Office Action dated May 28, 2009, and/or cited elsewhere are hereby incorporated by reference as if set forth in their entirety herein, as follows: DE 29 00 584, having the following German title "FLASCHENHALTERAHMEN ZUM GLEICHZEITIGEN BUENDELWEISEN UM-UND EINSETZEN VON IN ANFOERDERRICHTUNG PARALLELEN REIHEN AUFGESTAUTEN FLASCHEN U.DGL. IN KISTEN, KAESTEN, HARASSE O.DGL.," published on Jul. 17, 1980; DE 10 2004 047 826, having the following English translation of the German title "Method for transferring bottles from twenty-bottle to eleven-bottle crates uses grippers to rearrange bottles into groups of twelve, one bottle being placed in empty crate, while remainder of each group is used to completely fill crate," published on Mar. 30, 2006; DE 102 10 353, having the following English translation of the German title "Process for transferring bottles comprises moving pack tulips toward each other after receiving the bottles and before insertion of the bottles in packaging," published on Sep. 18, 2003; and DE 27 57 516, having the German title "FLASCHENHALTERAHMEN ZUM GLEICHZEITIGEN BUENDELWEISEN UM-UND EINSETZEN VON IN ZUR ANFOERDERRICHTUNG PARALLELEN REIHEN AUFGESTAUTEN FLASCHEN U.DGL. IN KISTEN, KAESTEN, HARASSE UND DGL.," published on Jun. 28, 1979.

The patents, patent applications, and patent publications listed above in the preceding paragraphs are herein incorporated by reference as if set forth in their entirety except for the exceptions indicated herein. The purpose of incorporating U.S. patents, Foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

The corresponding foreign and international patent publication applications, namely, Federal Republic of Germany Patent Application No. 10 2007 039 850.8, filed on filed on Aug. 23, 2007, having inventor(s) Joachim JUNGHANS, and DE-OS 10 2007 039 850.8, and DE-PS 10 2007 039 850.8, and International Application No. PCT/EP2008/006114, filed on Jul. 25, 2008, having WIPO Publication No. WO 2009/024246 A1 and inventor Joachim JUNGHANS, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, except for the exceptions indicated herein, are hereby incorporated by reference as if set forth in their entirety herein.

The purpose of incorporating the corresponding foreign equivalent patent application(s), that is, PCT/EP2008/006114 and Federal Republic of Germany Patent Application No. 10 2007 039 850.8, is solely for the purpose of providing a basis of correction of any wording in the pages of the present application, which may have been mistranslated or misinterpreted by the translator. However, words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments of the patents, patent applications, and patent publications, are not generally considered to be incorporated by reference herein.

Statements made in the original foreign patent applications PCT/EP2008/006114 and Federal Republic of Germany Patent Application No. 10 2007 039 850.8 from which this patent application claims priority which do not have to do with the correction of the translation in this patent application are not to be included in this patent application in the incorporation by reference.

Any statements about admissions of prior art in the original foreign patent applications PCT/EP2008/006114 and Federal Republic of Germany Patent Application No. 10 2007 039 850.8 are not to be included in this patent application in the incorporation by reference, since the laws relating to prior art in non-U.S. Patent Offices and courts may be substantially different from the Patent Laws of the United States.

All of the references and documents cited in any of the documents cited herein, except for the exceptions indicated herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Packing head
2 Frame of the packing head
3, 3a Cross carriage
4, 5 Guiding and actuating elements
6 Sliding block
7, 8 Actuator
9 Packing bell or gripper for bottles F
10 Packing table
11, 12 Bottle group
13 Auxiliary carriages
14 Bottle group
F Bottle
X X-axis
Y Y-axis
Z Z-axis

What is claimed is:

1. A container grouping and packing arrangement comprising:
   a container pick-up area and a plurality of container gripping devices being configured to grip a plurality of containers in said pick-up area;
   a plurality of movement arrangements being operatively connected to said gripping devices and being configured to move said gripping devices between a plurality of positions;
   said plurality of movement arrangements being configured to adjust the positions of each of said gripping devices in at least one direction perpendicular or essentially perpendicular to the vertical, rotational axes of containers to:
   (A) rearrange a first group of gripped containers from a first positional pattern of containers relative to one another to a second positional pattern different than said first positional pattern, and
   (B) rearrange a second group of gripped containers from a first positional pattern to a third positional pattern different than said first positional pattern and said second positional pattern; and
   said container gripping devices being configured to be moved to place groups of positioned containers in a delivery area and/or in at least one package.

2. The container grouping and packing arrangement according to claim 1, wherein said plurality of movement arrangements are configured to adjust the positions of each of said gripping devices in two directions perpendicular or essentially perpendicular to the vertical, rotational axes of containers, which two directions are perpendicular or essentially perpendicular to one another.

3. The container grouping and packing arrangement according to claim 2, wherein:
   each of said plurality of movement arrangements comprises at least one slidable carriage, and each of said container gripping devices is disposed on one of said slidable carriages; and
   each of said slidable carriages is individually movable between a plurality of positions in one of said two directions or in a plane defined by said two directions.

4. The container grouping and packing arrangement according to claim 3, wherein said slidable carriages are movable in groups.

5. The container grouping and packing arrangement according to claim 4, wherein:
   each of said plurality of movement arrangements comprises a movable guide element, each being movable in one of said two directions; and
   each of said movable guide elements is configured and disposed to support a plurality of said slidable carriages thereon.

6. The container grouping and packing arrangement according to claim 5, wherein:
   said guide elements comprise elongated guide elements; and
   said guide elements are configured to be movable in a direction perpendicular to the length of said guide elements.

7. The container grouping and packing arrangement according to claim 6, wherein each of said slidable carriages is movably mounted on a pair of guide elements at the intersection point of said pair of guide elements, each of which pair of guide elements is disposed perpendicular or essentially perpendicular to one another.

8. The container grouping and packing arrangement according to claim 7, wherein said container grouping and packing arrangement comprises actuators configured to move said guide elements between a plurality of positions to move slidable carriages mounted thereon in a direction perpendicular to the length of said guide elements.

9. The container grouping and packing arrangement according to claim 8, wherein each of said guide elements comprises a guide rail or guide bar.

10. The container grouping and packing arrangement according to claim 9, wherein at least one of said slidable carriages comprises a movement device configured to move a gripping device connected thereto in an additional movement comprising at least one of: a controlled linear movement and a controlled rotational movement.

11. The container grouping and packing arrangement according to claim 3, wherein at least one of said slidable carriages comprises a movement device configured to move a gripping device connected thereto in an additional movement comprising at least one of: a controlled linear movement and a controlled rotational movement.

12. A method of grouping and packing containers, said method comprising the steps of:
 a) gripping a first plurality of containers in a pick-up area using a plurality of container gripping devices of a packing arrangement;
 b) activating movement arrangements operatively connected to said gripping devices, which movement arrangements are configured to move said gripping devices between a plurality of positions;
 c) adjusting the positions of a plurality of said gripping devices in at least one direction perpendicular or essentially perpendicular to the vertical, rotational axes of said containers and thereby
  c2) rearranging said containers from a first positional pattern of containers relative to one another to a second positional pattern different from said first positional pattern;
 d) depositing said positioned containers in a delivery area and/or in at least one package; and
 e) repeating steps a), b), and c) and thereby
  c3) rearranging said containers from a first positional pattern to a third positional pattern different from said first and second positional patterns, and then repeating step (d).

13. The method according to claim 12, wherein said step of adjusting the positions of a plurality of said gripping devices comprises adjusting the positions of each of said gripping devices in two directions perpendicular or essentially perpendicular to the vertical, rotational axes of containers, which two directions are perpendicular or essentially perpendicular to one another.

14. The method according to claim 13, wherein:
 each of said plurality of movement arrangements comprises at least one slidable carriage, and each of said container gripping devices is disposed on one of said slidable carriages; and
 each of said slidable carriages is individually movable between a plurality of positions in one of said two directions or in a plane defined by said two directions.

15. The method according to claim 14, wherein:
said slidable carriages are movable in groups.

16. The method according to claim 15, wherein:
 each of said plurality of movement arrangements comprises a movable guide element, each being movable in one of said two directions; and
 each of said movable guide elements is configured and disposed to support a plurality of said slidable carriages thereon.

17. The method according to claim 16, wherein:
said guide elements comprise elongated guide elements; and
said guide elements are configured to be movable in a direction perpendicular to the length of said guide elements.

18. The method according to claim 17, wherein:
 each of said guide elements comprises a guide rail or guide bar;
 each of said slidable carriages is movably mounted on a pair of guide elements at the intersection point of said pair of guide elements, each of which pair of guide elements is disposed perpendicular or essentially perpendicular to one another;
 said container grouping and packing arrangement comprises actuators configured to move said guide elements between a plurality of positions to move slidable carriages mounted thereon in a direction perpendicular to the length of said guide elements; and
 said method step c) comprises moving one of a pair of guide elements in a direction perpendicular to the length thereof and thereby sliding slidable carriages along the length of the other of the pair of guide elements.

19. The method according to claim 18, wherein at least one of said slidable carriages comprises a movement device configured to move a gripping device connected thereto in an additional movement comprising at least one of: a controlled linear movement and a controlled rotational movement, and said method further comprises adjusting the position of a gripping device by moving the gripping device with said movement device.

20. The method according to claim 14, wherein at least one of said slidable carriages comprises a movement device configured to move a gripping device connected thereto in an additional movement comprising at least one of: a controlled linear movement and a controlled rotational movement, and said method further comprises adjusting the position of a gripping device by moving the gripping device with said movement device.

* * * * *